(12) United States Patent
Bogle

(10) Patent No.: US 12,162,690 B2
(45) Date of Patent: Dec. 10, 2024

(54) ROTATABLE RETAINER FOR HINGE RODS

(71) Applicant: Laitram, L.L.C., Harahan, LA (US)

(72) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 123 days.

(21) Appl. No.: 18/022,204

(22) PCT Filed: Aug. 11, 2021

(86) PCT No.: PCT/US2021/045567
§ 371 (c)(1),
(2) Date: Feb. 20, 2023

(87) PCT Pub. No.: WO2022/072070
PCT Pub. Date: Apr. 7, 2022

(65) Prior Publication Data
US 2023/0312256 A1 Oct. 5, 2023

Related U.S. Application Data

(60) Provisional application No. 63/084,921, filed on Sep. 29, 2020.

(51) Int. Cl.
*B65G 17/08* (2006.01)
*B65G 17/38* (2006.01)

(52) U.S. Cl.
CPC .............. *B65G 17/08* (2013.01); *B65G 17/38* (2013.01); *B65G 2207/12* (2013.01)

(58) Field of Classification Search
None
See application file for complete search history.

(56) References Cited

U.S. PATENT DOCUMENTS

| 5,899,322 | A | 5/1999 | Gamble, Jr. | |
| 10,155,625 | B1 * | 12/2018 | Bogle | B65G 17/46 |
| 11,708,221 | B2 * | 7/2023 | Talsma | B65G 17/40 |
| | | | | 198/778 |
| 2014/0021020 | A1 | 1/2014 | Bogle et al. | |
| 2018/0362256 | A1 | 12/2018 | Bogle et al. | |
| 2020/0216269 | A1 | 7/2020 | Christopher | |

* cited by examiner

*Primary Examiner* — William R Harp
(74) *Attorney, Agent, or Firm* — James T. Cronvich

(57) ABSTRACT

A rotatable retainer for hinge rods in modular conveyor belts. The rod retainer includes a plug that is rotatably received in a socket in the edge portion of a conveyor belt module. An aperture through the plug is adjustable between a first locked and operational position guiding a hinge rod obliquely into a hinge-joint passageway between adjacent rows of belt modules and an unlocked second position guiding the hinge rod straight into the passageway. A sideguard, such as for a stacker belt, can optionally be formed with the plug.

21 Claims, 3 Drawing Sheets

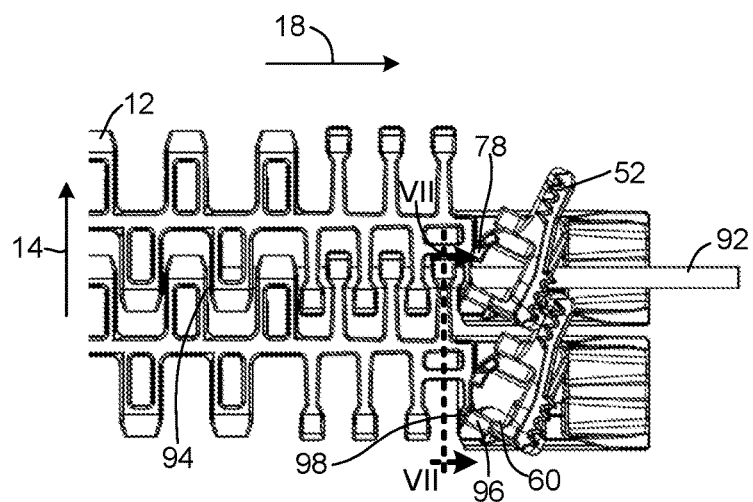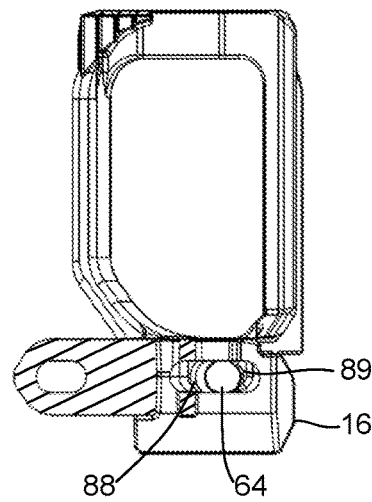
FIG. 6  FIG. 7
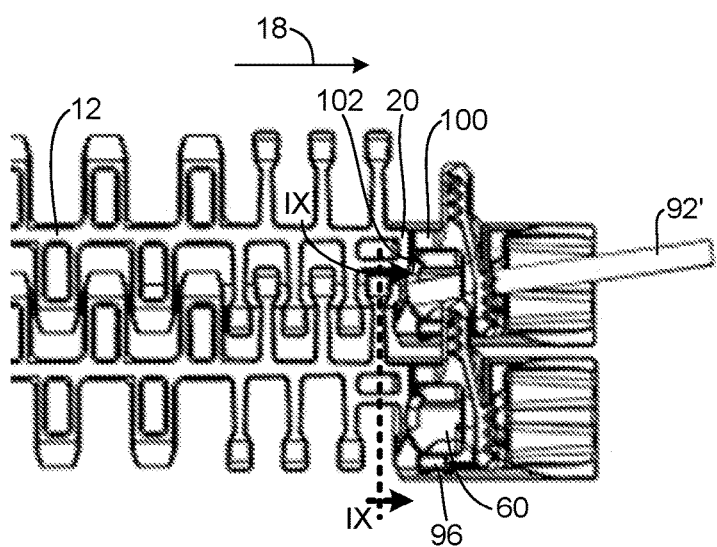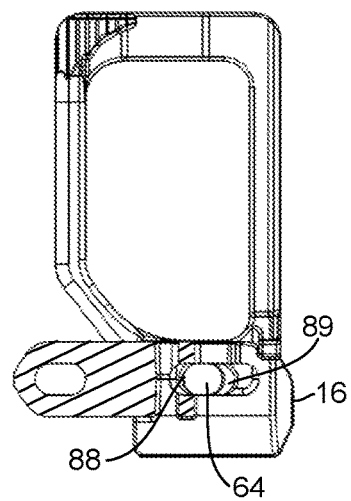
FIG. 8  FIG. 9

ROTATABLE RETAINER FOR HINGE RODS

BACKGROUND

The invention relates generally to power-driven conveyors and in particular to the retention of hinge rods in articulated modular conveyor belts.

Modular plastic conveyor belts are constructed of rows of one or more belt modules linked together by hinge rods received in lateral passageways formed by aligned apertures in interleaved hinge elements of consecutive rows. The belts articulate at the hinge joints formed between consecutive rows. Many schemes are used to prevent hinge rods from working out of the lateral passageways during belt operation. Examples of rod retention for headless hinge rods include belt-edge plugs, resilient belt-edge flaps, fixed belt-edge occlusions, and slidable or rotatable barriers movable from occluding positions completely blocking the passageway to non-occluding positions.

The hinge rods used in modular plastic conveyor belts are most often made of plastic and are bendable. But for wide belts supported from below at widely spaced positions across the width of the belt, steel hinge rods are often necessary to provide sufficient beam strength to support the belt and its load. During the assembly of a conveyor belt, plastic hinge rods, because of their flexibility, can be bent slightly during insertion into the passageways to avoid fixed belt-edge occlusions. But more rigid hinge rods, such as stainless steel rods, aren't so bendable. So there is a need for rod retention in a conveyor belt that effectively accommodates the installation and removal of both flexible and rigid hinge rods.

SUMMARY

One version of a conveyor belt module embodying features of the invention comprises a module body extending from a first end to a second in a length direction, from a first side to a second side in a width direction, and from a top to a bottom in a thickness direction, a belt edge portion extending outward of the first side of the module body, and a rod retainer. The module body includes a first set of hinge elements spaced apart along the first end and having aligned bores and a second set of hinge elements spaced apart along the second end and having aligned bores. The belt edge portion includes an upper surface and a lower surface, a wall bounding a socket that opens onto the upper surface and the lower surface and that has a hole through the wall aligned with the bores through the first set of hinge elements to form with the bores a passageway that extends in the width direction for receiving a hinge rod. The rod retainer includes a plug sized to mate with the socket for rotation about an axis of rotation perpendicular to the length direction and the width direction and an aperture elongated from a first end wall to a second end wall both extending through the plug from a first opening to a second opening. The first opening is closer to the first side of the module body than is the second opening, and the distance between the first end wall and the second end wall is greater at the first opening than at the second opening. The plug is rotatable about the axis of rotation over a range of angles between a first position and a second position. The second opening of the aperture is farther from the first end of the module body when the plug is in the first position than when in the second position.

Another version of a conveyor belt module comprises a module body extending from a first end to a second in a length direction, from a first side to a second side in a width direction, and from a top to a bottom in a thickness direction, a belt edge portion extending outward of the first side of the module body, and a rod retainer. The module body includes a first set of hinge elements spaced apart along the first end and having aligned bores and a second set of hinge elements spaced apart along the second end and having aligned bores. The belt edge portion includes an upper surface and a lower surface, a wall bounding a socket that opens onto the upper surface and the lower surface and that has a hole through the wall aligned with the bores through the first set of hinge elements to form with the bores a passageway that extends in the width direction for receiving a hinge rod. The rod retainer includes a plug sized to mate with the socket for rotation about an axis of rotation perpendicular to the length direction and the width direction and an aperture elongated from a first end wall to a second end wall both extending through the plug from a first opening to a second opening. The first opening is closer to the first side of the module body than is the second opening, and the first end wall diverges from the second end wall toward the first opening. The plug is rotatable about the axis of rotation over a range of angles between a first position and a second position. The first end wall is oblique to the width direction of the module body when the plug is in the first position and wherein the second end wall is oblique to the width direction when the plug is in the second position.

A conveyor belt embodying features of the invention comprises a plurality of rows of one or more conveyor belt modules. Each conveyor belt module has a module body that extends from a first end to a second in a length direction in a direction of belt travel, from a first side to a second side in a width direction, and from a top to a bottom in a thickness direction and includes a first set of hinge elements with aligned bores spaced apart along the first end and a second set of hinge elements having bores spaced apart along the second end. The first set of hinge elements along the first end of the one or more conveyor belt modules of each row are interleaved with the second set of hinge elements along the second end of the one or more modules of a consecutive row so that the bores of the interleaved first and second sets of hinge elements define a passageway in the width direction. Hinge rods received in the passageways connect the rows together at hinge joints. At least one of the conveyor belt modules in each of the rows is an edge module that includes a belt edge portion that extends outward of the first side of the module body. The belt edge portion includes an upper surface and a lower surface and a wall that bounds a socket opening onto the upper surface and the lower surface and that has a hole through the wall aligned with the passageway along the first end. A rod retainer includes a plug sized to mate with the socket for rotation about an axis of rotation perpendicular to the length direction and the width direction and an aperture elongated from a first end wall to a second end wall both extending through the plug from a first opening to a second opening. The first opening is closer to the first side of the module body than is the second opening, and the distance between the first end wall and the second end wall is greater at the first opening than at the second opening. The plug is rotatable about the axis of rotation over a range of angles between a first position and a second position. The second opening of the aperture is farther from the first end of the module body when the plug is in the first position than when in the second position.

BRIEF DESCRIPTION OF THE DRAWINGS

FIG. 6 is a top plan view of the edge portion of two adjacent conveyor belt modules of FIG. 1 with the sideguards in an unlocked position.

FIG. 7 is an enlarged cross section of the edge portion of the conveyor belt modules of FIG. 6 taken along lines VII-VII.

FIG. 8 is a top plan view of the edge portion of the conveyor belt modules of FIG. 6 with the sideguards in a locked position.

FIG. 9 is an enlarged cross section of the edge portion of the conveyor belt module of FIG. 8 taken along lines IX-IX.

DETAILED DESCRIPTION

Figure 1:
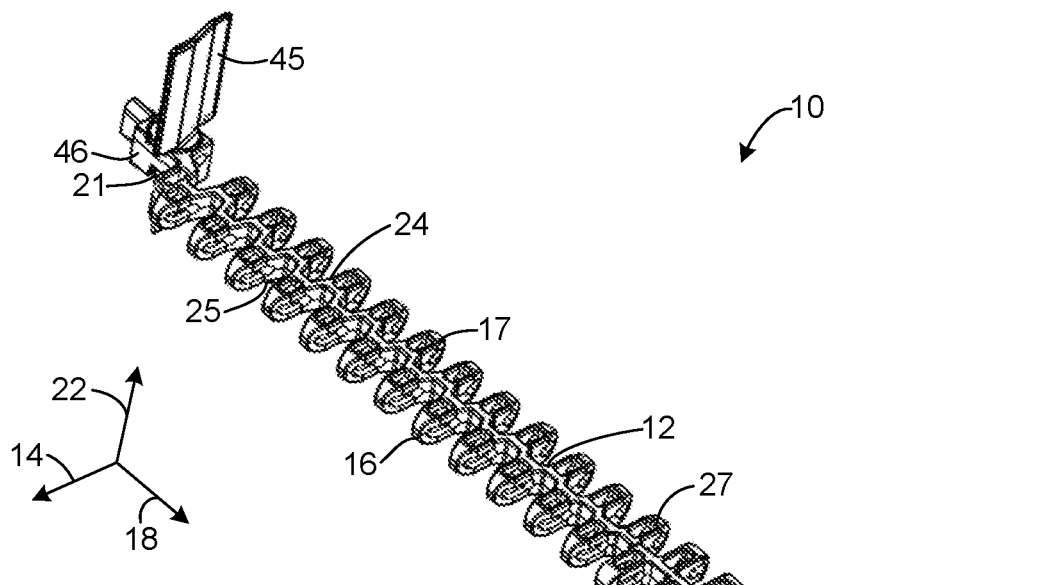
FIG. 1 is an isometric view of a conveyor belt module embodying features of the invention including a hinge-rod retainer on a sideguard.

A conveyor belt module embodying features of the invention is shown in FIG. 1. The belt module 10 has a module body 12 that extends in a length direction 14 from a first end 16 to a second end 17, in a width direction 18 from a first side 20 to a second side 21, and in a thickness direction 22 from a top 24 to a bottom 25. A first set 26 of hinge elements are spaced apart along the first end 16 of the module body 12. A second set 27 of hinge elements are spaced apart along the second end 17 of the module body 12. The first and second sets 26, 27 of hinge elements each have aligned bores 28, 29. In this version the bores 28, 29 are elongated in the length direction 14, and the bores 28 in the first set 26 of hinge elements are elongated a longer distance than the bores 29 in the second set 27 of hinge elements.

Figure 2:
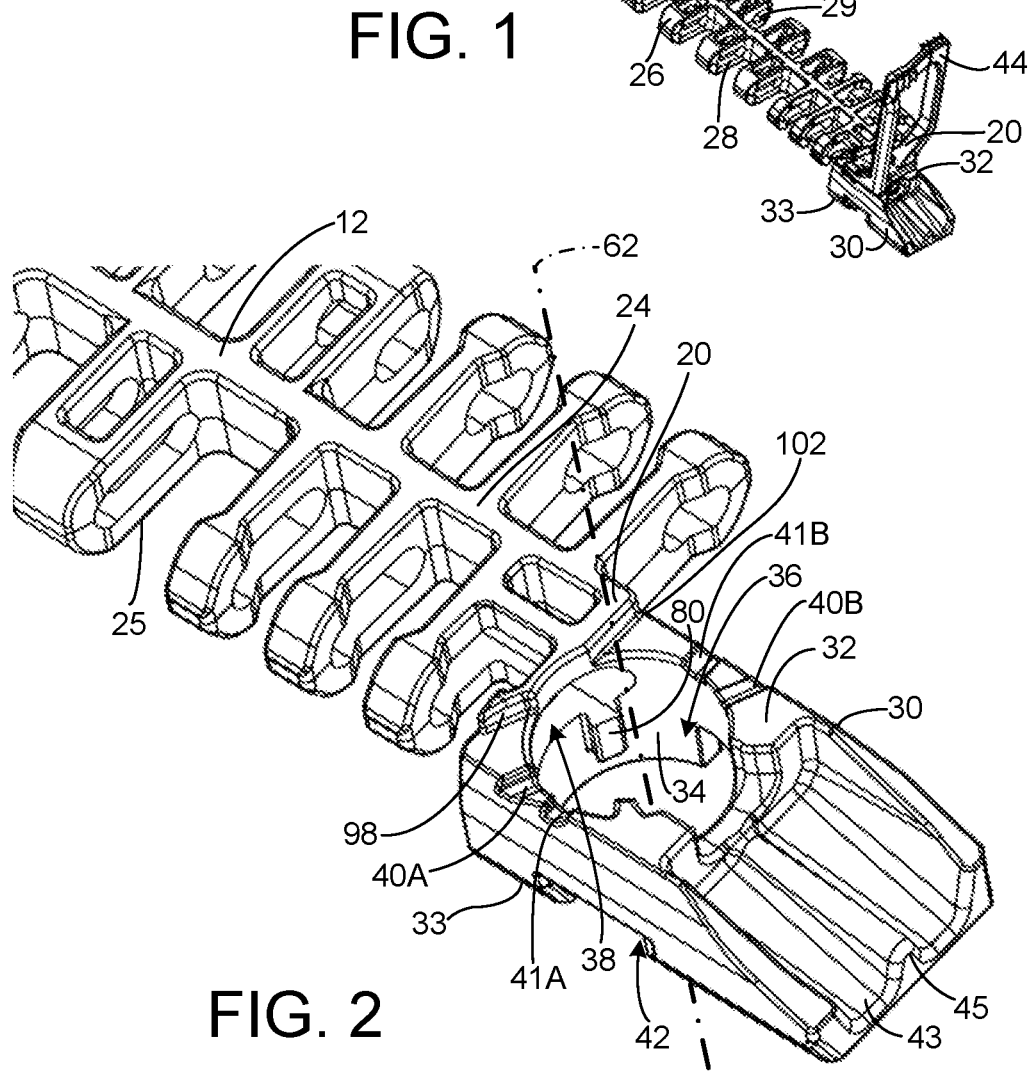
FIG. 2 is an enlarged view of one edge portion of the conveyor belt module of FIG. 1 with the rod-retaining sideguard removed.

A belt edge portion 30, shown enlarged in FIG. 2, extends outward of the first side 20 of the module body 12. The belt edge portion 30 has an upper surface 32 and a lower surface 33. A wall 34 bounds a socket 36 that opens onto the upper surface 32 and the lower surface 33. An elongated hole 38 through the wall 34 is aligned with the bores 28 in the first set 26 of hinge elements to form a passageway that extends in the width direction 18 (FIG. 1) for receiving hinge rods.

First depressions 40A, 40B and second depressions 41A, 41B in the upper surface 32 of the belt edge portion 30 form detents. The depressions 40A, 40B, 41A, 41B extend radially outward of the socket wall 34. The upper surface 32 of the belt edge portion 30 is recessed below the top level 24 of the module body 12. And the lower surface 33 of the belt edge portion 30 is below the level of the bottom 25 of the module body 12. A slot 42 in the lower surface 33 of the belt edge portion 30 extends in the length direction 14 and intersects the socket 36. The outer side of the edge portion 30 has a ramp 43 and a rib 45 separating the ramp into two ramp portions. The ramp 43 slopes downward toward the bottom surface 33 of the edge portion 30 away from the socket 36.

As shown in FIG. 1, a first sideguard 44 is mounted in the socket in the belt edge portion 30 at the first side 20 of the module body 12. A second sideguard 45 is mounted to a second belt edge portion 46 extending outward of the second side 21 of the module body 12.

Figure 3A:
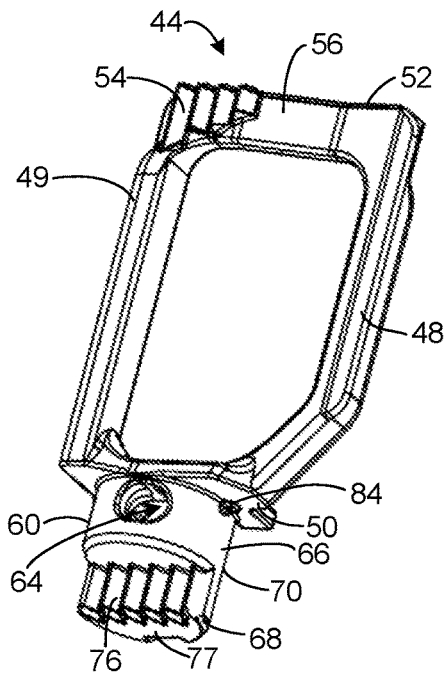
FIGS. 3A and 3B are front and back views of the sideguard of FIG. 1 with rod-retaining plug.
Figure 3B:
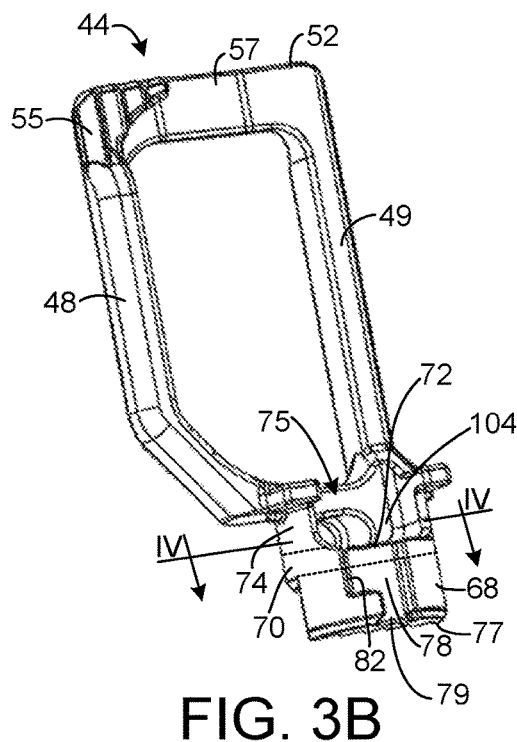

Details of the first sideguard 44 are shown in FIGS. 3A and 3B. The sideguard 44 has a pair of arms 48, 49 that extend upward from a base 50 to a cross bar 52. First and second sets 54, 55 of teeth are formed on first and second opposite faces 56, 57 of the cross bar 52. The first set 54 of teeth on the first face 56 of the cross bar 52 extends from the junction of the cross bar with the straight arm 49 a distance toward the junction of the cross bar with the belt arm 48. The widths of the teeth 54 decrease with distance from the straight arm 49. The second set 55 of teeth on the second face 57 of the cross bar 52 extends from the junction of the cross bar with the bent arm 48 a distance toward the junction of the cross bar with the straight arm 49. The widths of the teeth 55 decrease with distance from the bent arm 48. The ridges and valleys of both sets 54, 55 of teeth extend parallel to the straight arm 49.

The base 50 of the sideguard sits atop a rod-retaining plug 60 that is sized to mate with the socket 36 (FIG. 2). The socket 36 and the plug 60 are generally circular cylindrical in shape so that the plug can rotate in the socket about an axis of rotation 62 (FIG. 2) in the thickness direction 22 of the module body 12; i.e., perpendicular to the length and width direction 14, 18. An aperture 64 extends through the plug 60 and forms a portion of the hinge-joint passageway along the first end 16 of the module body 12.

Figure 4:
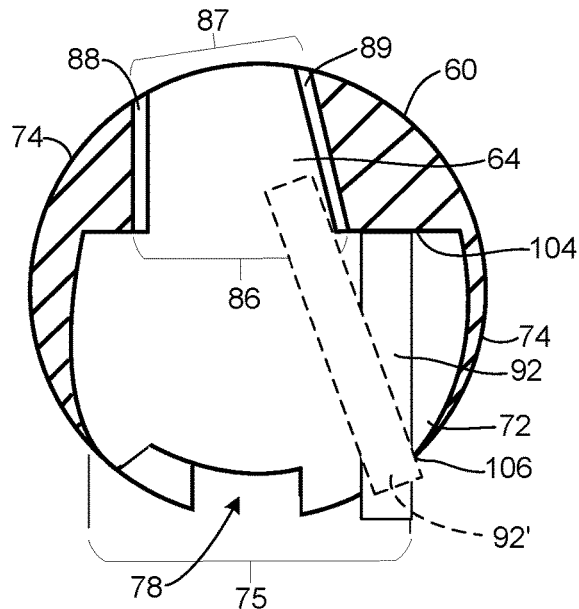
FIG. 4 is an enlarged cross section of the plug of FIG. 3B taken along lines IV-IV.

As FIGS. 3A and 3B show, the plug 60 comprises an upper partial cylinder 66 and a lower partial cylinder 68 sharing a cylindrical waist 70 topped by a flat surface 72. The bottom of the aperture 64 is tangent to the flat surface 72. As also shown in FIG. 4, the upper partial cylinder has an outer wall 74 that extends more than 180° around the flat surface 72 and leaves a gap 75 opposite the aperture 64. The lower partial cylinder 68 extends about 180° to form a half-cylinder having a D shape. The flat side of the D-shaped cylinder has a row of teeth 76 having ridges and valleys that extend from the bottom 77 of the plug to the waist 70. An inverted L-shaped groove 78 in the curved side of the D-shaped lower partial cylinder 68 extends from an entrance 79 at the bottom 77 to the flat surface 72.

The plug 60 of FIGS. 3A and 3B is mounted in the socket 36 of FIG. 2. During insertion of the plug 60 into the socket 36, the entrance 79 at one end of the longer vertical leg of the L-shaped groove 78 in the lower partial cylinder 68 is vertically aligned with a lug 80 protruding from the wall 34 of the socket. The plug 60 is then pushed into the socket 36. Once the plug 60 is in place in the socket 36 with its bottom 77 flush with the lower surface 33 of the belt edge portion 30, as in FIG. 5, the plug is rotated in the socket until the lug 80 is at the blind end 82 of the L-shaped groove 78 to lock the plug in place. Tabs 84 extending down from the base 50 sit in one pair of the depressions 41A, 41B when the plug 60 is in the locked position.

The cross section shown in FIG. 4 provides a top plan view of the plug's flat surface 72. The inverted L-shaped groove is shown radially opposite the aperture 64, but it could be positioned elsewhere on the plug's periphery. Or the plug 60 could have more than one groove, and the socket could have more than one plug. The aperture 64 extends through the plug 60 from a first opening 86 on the inner side of the upper partial cylinder 66 to an opposite second opening 87. The aperture 64 is elongated from a first end wall 88 to a second end wall 89. The second end wall 89 diverges from the first end wall 88 toward the first opening 86. So the distance between the first and second end walls 88, 89 is greater at the first opening 86 than at the second opening 87. When the plug 60 is inserted in the socket 36 (FIG. 2), the first opening 86 of the aperture 64 is nearer the first side 20 of the module body 12 (FIG. 2) than is the second opening 87.

Figure 5:
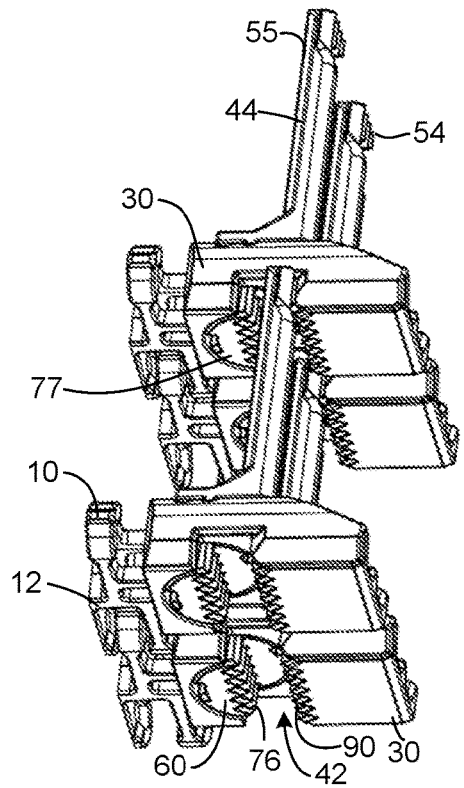
FIG. 5 is a bottom axonometric view of an outside portion of two tiers of a conveyor belt constructed of belt modules as in FIG. 1 in a spiral configuration.

The belt edge portions 30 of the conveyor belt modules 10 linked together to form a stacker belt traveling a helical path are shown in FIG. 5. The figure illustrates a portion of two tiers of the stacker belt on its helical path. The sideguards 44 are shown in locked first positions in which the rows 54, 55 of teeth on the cross bar 52 are parallel to the length direction of the module bodies 12. In the locked position of the plug 60, its teeth 76 are spaced apart across the lower slot 42 by an inwardly facing row 90 of confronting teeth. The teeth 76, 90 engage the teeth 54, 55 on the sideguards 44 of the immediately lower tier. The outer sideguards 44 at the outer side of the belt on the helical path, along with the inner sideguards 45 (FIG. 1) at the inner side of the belt, support the tiers above. And the engaged teeth 54, 55, 76, 90 at the outer side of the belt help keep the tiers aligned.

The plug 60 of the sideguards 44 also serves as a rod retainer to aid in the insertion and extraction of hinge rods from hinge-joint passageways between adjacent belt rows. In fact, the sideguard 44 can be considered an optional appendage to the rod retainer realized by the plug 60. So, for example, a more generic rod-retaining plug need not have the teeth 76, the arms 48, 49, and the cross bar 52. And the lower D-shaped partial cylinder 68 could be replaced with a complete circular cylinder.

FIG. 6 depicts the second position of the sideguards 44 for extracting a hinge rod 92 from a hinge joint 94 or for inserting a hinge rod into the hinge joint. In the second position the lug 80 (FIG. 2) on the socket wall 34 is received in the vertical leg of the L-shaped groove 78 in the plug 60. The cross bar 52 is oblique to the length direction 14 of the module body 12. The tabs 84 (FIG. 3A) at the bottom of the sideguard's base 50 sit in the detents' second depressions 40A, 40B to stabilize the plug 60 in the second position. A first foot 96 extending inward from the plug 60 also contacts a first stop 98 (also shown in FIG. 2) that defines, along with the detents 40A and 40B (FIG. 2), one end of a range of angles through which the plug can be rotated about its axis of rotation 62 (FIG. 2). In this unlocked second position, the plug 60 can be withdrawn vertically from the socket 36 (FIG. 2) along its axis of rotation.

When the plug 60 is in the second position, the aperture 64 is oriented such that its second end wall 89 is parallel to the width direction 18, and its first end wall 88 is oblique to the width direction 18. That allows the hinge rod 92 to be inserted into or extracted from the hinge joint 94 through the aperture 64 as shown in FIG. 7. When the rod-retaining plug 60 is in the second position, rigid or flexible hinge rods can be inserted or extracted because the aperture is aligned close to the first end 16 of the module body. With the plug 60 in the second position, the aperture 64 provides the hinge rod a straight path into the hinge-joint passageway formed by the interleaved hinge elements of adjacent modules, as shown in FIG. 6.

When the plug 60 is in the locked first position as shown in FIGS. 8 and 9, the aperture 64 is farther from the first end 16 of the module body than when the plug is rotated to the second position shown in FIGS. 6 and 7. So the hinge rod 92' must be bent as it passes the plug 60 on insertion and extraction. While a rigid steel, fiber-filled, or pultruded hinge rod cannot be inserted or extracted when the plug 60 is in the first position, a flexible plastic rod can be. With the plug 60 in the locked first position, the second end wall 89 of the aperture 64 is oblique to the width direction 18, while the first end wall 88 is parallel to the width direction. The oblique second end wall 89 presents an oblique guide surface to the hinge rod 92 that forces it to bend. As shown by comparing FIGS. 7 and 9, the second opening 87 of the aperture 64 is farther from the first end 16 when the plug 60 is in the first position as in FIG. 9 than when the plug is in the second position as in FIG. 7.

When the plug 60 is in the locked first position shown in FIG. 8, a second foot 100 that extends toward the module body 12 contacts a second stop 102 (also shown in FIG. 2) at the first side 20 of the module body 12. When the plug 60 is in the first position, the tabs 84 (FIG. 3A) sit in the detent depressions 41A, 41B. The second stop 102 and the detent depressions 41A, 41B define the other end of the range of angles through which the plug 60 can rotate.

A rod stop 104 formed by a vertical face of the upper partial cylinder 66 of the plug 60 is shown in FIGS. 3B and 4. When the plug 60 is in the locked first position of FIGS. 8 and 9, the hinge rod 92 is blocked from exiting the hinge-joint passageway by the rod stop 104 as shown in FIG. 4. When the plug 60 is rotated to the unlocked second position of FIGS. 6 and 7, the hinge rod 92' is deflected away from the rod stop 104 and toward the aperture 64 by the end 106 of the upper partial cylinder's outer wall 74.

Thus, the rod retainer formed by the plug in the socket permits the insertion of flexible hinge rods and prevents the retraction during belt operation or the manual extraction of rigid or flexible hinge rods when the plug is rotated to its locked, operational position as in FIGS. 8 and 9. And the rod retainer with the plug in the unlocked position permits the insertion and extraction of either rigid or flexible hinge rods.

Other versions of the rod-retaining plug and socket are possible. For example, the bottom 77 of the plug 60 in the locked position, shown flush with the lower surface 33 of the belt edge portion 30 in FIG. 5, could instead protrude from the socket 36 past the lower surface or could be recessed inward of the lower surface. For example, if the plug 60 is made of a strong high-friction material, it could protrude past the lower surface 33 of the belt edge portion 30. If the plug 60 is made of a low-friction material, it could be recessed inward of the lower surface 33. As another example, instead of having an L-shaped groove 78 as in FIG. 3B, the plug 60 could have a helical groove with the plug advancing axially into the socket as it's rotated.

What is claimed is:

1. A conveyor belt module comprising:
   a module body extending from a first end to a second in a length direction, from a first side to a second side in a width direction, and from a top to a bottom in a thickness direction and including:
      a first set of hinge elements spaced apart along the first end and having aligned bores, and a second set of hinge elements spaced apart along the second end and having aligned bores;
   a belt edge portion extending outward of the first side of the module body and including:
      an upper surface and a lower surface;
      a wall bounding a socket opening onto the upper surface and the lower surface and having a hole through the wall aligned with the bores through the first set of hinge elements to form with the bores a passageway that extends in the width direction for receiving a hinge rod;
   a rod retainer including:
      a plug sized to mate with the socket for rotation about an axis of rotation perpendicular to the length direction and the width direction;
      an aperture elongated from a first end wall to a second end wall both extending through the plug from a first opening to a second opening;

wherein the first opening is closer to the first side of the module body than is the second opening and wherein the distance between the first end wall and the second end wall is greater at the first opening than at the second opening;

wherein the plug is rotatable about the axis of rotation over a range of angles between a first position and a second position;

wherein the second opening of the aperture is farther from the first end of the module body when the plug is in the first position than when in the second position.

2. The conveyor belt module as claimed in claim 1 wherein the module body includes stop structure proximate the socket that limits the range of rotation of the plug about the axis of rotation.

3. The conveyor belt module as claimed in claim 2 wherein the stop structure is at the top of the module body at the first side.

4. The conveyor belt module as claimed in claim 1 wherein the belt edge portion includes detents proximate the socket and wherein the rod retainer includes tabs that engage a first set of the detents when the plug is in the first position and a second set of the detents when the plug is in the second position.

5. The conveyor belt module as claimed in claim 4 wherein the detents are formed in the upper surface of the belt edge portion.

6. The conveyor belt module as claimed in claim 1 wherein the lower surface of the belt edge portion is below the level of the bottom of the module body.

7. The conveyor belt module as claimed in claim 1 wherein the lower surface of the belt edge portion includes a slot extending though the lower surface in the length direction and intersecting the socket.

8. The conveyor belt module as claimed in claim 7 wherein the belt edge portion includes a first row of teeth formed along a side of the slot opposite the module body and wherein the plug includes a second row of teeth bounding the opposite side of the slot from the first row of teeth.

9. The conveyor belt module as claimed in claim 8 wherein the first and second rows of teeth are parallel when the plug is in the first position and wherein the second row of teeth is oblique to the first row of teeth when the plug is in the second position.

10. The conveyor belt module as claimed in claim 1 wherein the belt edge portion includes a ramp sloping downward toward the bottom surface away from the socket and a rib separating the ramp into two ramp portions.

11. The conveyor belt module as claimed in claim 1 wherein the rod retainer includes a base atop the plug and a pair of arms extending upward from base to a cross bar having first and second side faces.

12. The conveyor belt module as claimed in claim 11 wherein the cross bar includes a set of teeth extending along a portion of each of the first and second side faces.

13. The conveyor belt module as claimed in claim 12 wherein the set of teeth extending along a portion of the first side face is offset in the width direction and in the length direction from the set of teeth extending along a portion of the second side face when the plug is in the first position.

14. The conveyor belt module as claimed in claim 1 wherein the aperture in the rod retainer is bounded by a first wall portion adjacent the blocking structure at one end of the aperture and a second wall structure at the opposite end, wherein the first wall portion is oblique to the second wall portion so that the aperture has a first opening facing the module body and a smaller second opening facing away from the module body.

15. The conveyor belt module as claimed in claim 1 wherein the first end wall is oblique to the width direction of the module body when the plug is in the first position and wherein the second end wall is oblique to the width direction when the plug is in the second position.

16. A conveyor belt module comprising:
a module body extending from a first end to a second in a length direction, from a first side to a second side in a width direction, and from a top to a bottom in a thickness direction and including:
   a first set of hinge elements spaced apart along the first end and having aligned bores, and a second set of hinge elements spaced apart along the second end and having aligned bores;
a belt edge portion extending outward of the first side of the module body and including:
   an upper surface and a lower surface;
   a wall bounding a socket opening onto the upper surface and the lower surface and having a hole through the wall aligned with the bores through the first set of hinge elements to form with the bores a passageway that extends in the width direction for receiving a hinge rod;
a rod retainer including:
   a plug sized to mate with the socket for rotation about an axis of rotation perpendicular to the length direction and the width direction;
   an aperture elongated from a first end wall to a second end wall both extending through the plug from a first opening to a second opening;
   wherein the first opening is closer to the first side of the module body than is the second opening and wherein the first end wall diverges from the second end wall toward the first opening;
   wherein the plug is rotatable about the axis of rotation over a range of angles between a first position and a second position;
   wherein the first end wall is oblique to the width direction of the module body when the plug is in the first position and wherein the second end wall is oblique to the width direction when the plug is in the second position.

17. A conveyor belt comprising:
a plurality of rows of one or more conveyor belt modules, each conveyor belt module having a module body that extends from a first end to a second in a length direction in a direction of belt travel, from a first side to a second side in a width direction, and from a top to a bottom in a thickness direction and including a first set of hinge elements spaced apart along the first end and having aligned bores, and a second set of hinge elements spaced apart along the second end and having aligned bores, wherein the first set of hinge elements along the first end of the one or more conveyor belt modules of each row are interleaved with the second set of hinge elements along the second end of the one or more modules of a consecutive row so that the bores of the interleaved first and second sets of hinge elements define a passageway in the width direction;
a plurality of hinge rods received in the passageways to connect the rows together at hinge joints;
wherein at least one of the conveyor belt modules in each of the rows is an edge module that includes:

a belt edge portion extending outward of the first side of the module body and including:
  an upper surface and a lower surface;
  a wall bounding a socket opening onto the upper surface and the lower surface and having a hole through the wall aligned with the passageway along the first end;
a rod retainer including:
  a plug sized to mate with the socket for rotation about an axis of rotation perpendicular to the length direction and the width direction;
  an aperture elongated from a first end wall to a second end wall both extending through the plug from a first opening to a second opening;
  wherein the first opening is closer to the first side of the module body than is the second opening and wherein the distance between the first end wall and the second end wall is greater at the first opening than at the second opening;
  wherein the plug is rotatable about the axis of rotation over a range of angles between a first position and a second position;
  wherein the second opening of the aperture is farther from the first end of the module body when the plug is in the first position than when in the second position.

18. The conveyor belt as claimed in claim 17 wherein the blocking structure has a face facing the first side of the module body and is perpendicular to the width direction when the plug is in the first position and is oblique to the width direction when the plug is in the second position.

19. The conveyor belt as claimed in claim 17 wherein the aperture through the plug extends in the length direction from a first wall portion adjacent the blocking structure to an opposite second wall portion and wherein the first wall portion diverges from the second wall portion toward the module body.

20. The conveyor belt as claimed in claim 17 wherein the rod retainer has an upwardly extending sideguard having first and second side faces separated in the width direction with a first set of teeth along the first side face and a second set of teeth along second side face.

21. The conveyor belt as claimed in claim 20 wherein the belt edge portion includes:
  a slot extending through the lower surface in the length direction intersecting the socket; and
  a first row of teeth formed along a side of the slot opposite the module body; and
  wherein the plug includes a second row of teeth bounding the opposite side of the slot from the first row of teeth; and
  wherein the first and second rows of teeth engage the first and second sets of teeth of a sideguard in a belt row below when the conveyor belt is arranged to advance along a helical path.

* * * * *